ⓘⓘ US011365576B2

(12) United States Patent
Herthan et al.

(10) Patent No.: US 11,365,576 B2
(45) Date of Patent: *Jun. 21, 2022

(54) ADJUSTMENT DRIVE OF A MOTOR VEHICLE AND DRIVE UNIT FOR AN ADJUSTMENT DRIVE

(71) Applicant: BROSE FAHRZEUGTEILE GMBH & CO. KOMMANDITGESELLSCHAFT, BAMBERG, Bamberg (DE)

(72) Inventors: Bernd Herthan, Michelau (DE); Bertram Bopp, Bamberg (DE); Reinhold Hopf, Kueps (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/159,726

(22) Filed: Jan. 27, 2021

(65) Prior Publication Data

US 2021/0148153 A1      May 20, 2021

Related U.S. Application Data

(62) Division of application No. 15/615,207, filed on Jun. 6, 2017, now Pat. No. 11,021,902.

(30) Foreign Application Priority Data

Jun. 6, 2016   (DE) .......................... 102016209915.9

(51) Int. Cl.
*H01H 47/22*    (2006.01)
*E05F 15/603*   (2015.01)
(Continued)

(52) U.S. Cl.
CPC .......... *E05F 15/603* (2015.01); *E05F 15/622* (2015.01); *E05F 15/70* (2015.01);
(Continued)

(58) Field of Classification Search
CPC ....... E05F 15/603; E05F 15/622; E05F 15/70; F16H 25/20; H01H 47/22; E05Y 2400/41;
(Continued)

(56) References Cited

U.S. PATENT DOCUMENTS 9,631,413 B2 * 4/2017 Jang ...................... E05F 15/611
10,020,150 B2   7/2018 Nagler et al.
(Continued)

FOREIGN PATENT DOCUMENTS

CN    104895445 A    5/2015
CN    105610382 A    5/2016
(Continued)

*Primary Examiner* — Pete T Lee
(74) *Attorney, Agent, or Firm* — Laurence A. Greenberg; Werner H. Stemer; Ralph E. Locher

(57) ABSTRACT

An adjustment drive of a motor vehicle, in particular for an electromotively operated tailgate, having an adjustable part. A drive unit has a first drive train and a second drive train. Each drive train has a variable-length actuation part attached to the adjustable part. The actuation part is driven by an electric motor of the respective drive train. The first drive train has at least one sensor for detection of a position of a rotating part, and the second drive train has no more than one sensor for detection of a position of a rotating part. We also describe a drive unit of an adjustment drive of a motor vehicle.

13 Claims, 4 Drawing Sheets

(51) Int. Cl.
*E05F 15/70* (2015.01)
*E05F 15/622* (2015.01)
*F16H 25/20* (2006.01)

(52) U.S. Cl.
CPC ............. *F16H 25/20* (2013.01); *H01H 47/22* (2013.01); *E05Y 2400/41* (2013.01); *E05Y 2400/44* (2013.01); *E05Y 2900/542* (2013.01); *E05Y 2900/55* (2013.01)

(58) Field of Classification Search
CPC ........... E05Y 2400/44; E05Y 2900/542; E05Y 2900/55
See application file for complete search history.

(56) References Cited

U.S. PATENT DOCUMENTS

| | | | |
|---|---|---|---|
| 2004/0124662 A1 | 7/2004 | Cleland | E05F 1/1091 296/146.4 |
| 2007/0252402 A1* | 11/2007 | Marshall | B62D 33/0273 296/57.1 |
| 2009/0222174 A1* | 9/2009 | Frommer | E05F 15/77 296/146.4 |
| 2013/0024076 A1* | 1/2013 | Fukui | E05F 15/622 701/49 |
| 2015/0224859 A1* | 8/2015 | Warburton | E05F 5/12 701/49 |
| 2015/0361711 A1* | 12/2015 | Baumann | E05F 15/70 49/29 |
| 2017/0350180 A1 | 12/2017 | Herthan et al. | |
| 2018/0321758 A1* | 11/2018 | Serban | G06F 3/0325 |

FOREIGN PATENT DOCUMENTS

| | | |
|---|---|---|
| CN | 207382142 U | 5/2018 |
| DE | 10055378 A1 | 5/2002 |
| DE | 10243893 A1 | 4/2004 |
| DE | 202006001741 U1 | 2/2006 |
| DE | 102012025109 A1 | 6/2014 |

\* cited by examiner

ADJUSTMENT DRIVE OF A MOTOR VEHICLE AND DRIVE UNIT FOR AN ADJUSTMENT DRIVE

CROSS-REFERENCE TO RELATED APPLICATION

This application is a divisional of patent application Ser. No. 15/615,207, filed Jun. 6, 2017; this application also claims the priority, under 35 U.S.C. § 119, of German patent application No. DE 10 2016 209 915.9, filed Jun. 6, 2016; the prior applications are herewith incorporated by reference in their entirety.

BACKGROUND OF THE INVENTION

Field of the Invention

The invention relates to an adjustment drive of a motor vehicle having a drive unit which has a first drive train and a second drive train. The adjustment drive is in particular an electromotively operated tailgate. The invention furthermore relates to a drive unit of an adjustment drive.

Motor vehicles commonly comprise adjustable parts, for example side windows and/or a sliding roof, which can be opened or closed by means of an electromotive adjustment drive. The respective adjustable part is actuated by means of a gearing driven by an electric motor. The gearing comprises, in particular, a spindle. For setting the movement speed of the adjustable part, the electric motor is operated using pulse width modulation (PWM), and the electrical energy supplied is thereby set. To lower manufacturing costs for the control device required for this purpose, the direction reversal of the adjustable part is realized by way of a bridge circuit. Here, an electrical output of the electric motor can, by means of a relay, be connected either to ground or to the potential of an on-board electrical system, which is normally 12 V. The remaining electrical output of the electric motor is electrically connected to the PWM controller, which in turn is connected by means of one or two semiconductor switches likewise either to the potential of the on-board electrical system or else to ground. As a result, depending on the actuation of the semiconductor switches and of the relay, the direction of a current flow through the electric motor can be set, wherein the average current intensity is set by way of the PWM controller.

It is normally sought for the adjustable part to be moved along the adjustment travel with a non-constant speed, with the adjustable part rather being brought to a standstill substantially by means of a continuous speed reduction in the region of an end stop. If the end stop is not correctly detected, relatively intense mechanical load on the adjustable part and on further constituent parts of the adjustment drive is possible. It is sometimes also demanded that the adjustable part assume fixedly predefined positions, such as for example a half-open position or the like. As a result, it is necessary for the position of the adjustable part along the adjustment travel to be known relatively accurately. For this purpose, use is normally made of Hall sensors, wherein the electric motor normally has two Hall sensors which are offset with respect to one another substantially through 90° with respect to the axis of rotation of the electric motor. As a result, by means of the two Hall sensors, it is made possible for both the rotational speed of the electric motor and the direction of rotation thereof to be reliably detected, specifically in particular by means of a comparison of the phase offset of the sinusoidal or cosinusoidal signals generated by each of the two Hall sensors. Here, the position of the adjustable part is determined on the basis of the determined rotations of the electric motor.

Electromotively operated tailgates normally have two such electric motors, such that the relatively heavy tailgate does not have to be pivoted by a single electric motor. As a result, the power imparted by each of the electric motors is relatively low, as a result of which it is possible to use electric motors of relatively small construction, which can normally be produced relatively inexpensively. Normally, each of the electric motors is indirectly connected by means of a mechanism to the tailgate, wherein the two attachment points are spaced relatively far apart from one another in order that the tailgate is pivoted substantially without distortion. Here, it is however necessary for the two electric motors to be operated synchronously, such that the attachment points of the electric motors are always situated at the same height. To realize this, electric motors of identical design are used, each of which thus has two Hall sensors. It is thus made possible for the speed of the two electric motors to be monitored, and for a current feed to be adapted if necessary.

BRIEF SUMMARY OF THE INVENTION

It is accordingly an object of the invention to provide a drive system which overcomes the above-mentioned and other disadvantages of the heretofore-known devices and methods of this general type and which provides for a particularly suitable adjustment drive of a motor vehicle, having a drive unit, and which provides for a drive unit of an adjustment drive of a motor vehicle, wherein the production costs are advantageously reduced.

With the foregoing and other objects in view there is provided, in accordance with the invention, an adjustment drive for driving an adjustable part of a motor vehicle. The novel adjustment drive comprises:

a drive unit having a first drive train with a variable-length actuation part and a second drive train with a variable-length actuation part, each said variable-length actuation part being connected to the adjustable part of the motor vehicle;

a first electric motor connected to and driving said actuation part of said first drive train and a second electric motor connected to and driving said actuation part of said second drive train; and said first drive train having at least one sensor for detecting a position of a rotating part of said first drive train, and said second drive train having at most one sensor for detecting a position of a rotating part of said second drive train.

The novel device is particularly suitable for driving an electromotively operated tailgate.

The adjustment drive is a constituent part of a motor vehicle and has an adjustable part and a drive unit. The adjustment drive is for example an electromotive seat adjustment means, an electromotively operated side window or an electromotively operated sliding roof. In this case, the adjustable part is a seat, a part of a seat, a window pane or the sliding roof. In an alternative to this, the adjustment drive is an electromotively operated door, and the adjustable part is the door. The adjustment device is particularly preferably an electromotively operated tailgate. In other words, as an adjustable part, the tailgate is pivoted by means of the drive unit into an open and/or closed position.

The drive unit has a first and a second drive train. Each of the two drive trains has a variable-length actuation part, wherein each of the two variable-length actuation parts is attached at one side to the adjustable part. For example, the variable-length actuation part is attached, in particular fastened, directly to the adjustable part. In an alternative to this, the respective variable-length actuation part is attached indirectly to the adjustable part, for example by means of a coupling piece or the like. The extent of each variable-length actuation part in a particular direction is variable. Each drive train furthermore has an electric motor, by means of which the respective variable-length actuation part is driven. Here, when the variable-length actuation part is driven, the extent thereof in a primary direction is varied, and thus the length thereof is varied, for example increased or reduced. The electric motor itself is for example a brush-type commutator motor or a brushless electric motor, in particular a brushless direct-current motor (BLDC).

In summary, the first drive train has, in particular, one of the variable-length actuation parts, which will hereinafter be referred to in particular as first variable-length actuation part. Furthermore, the first drive train has one of the electric motors, which will hereinafter be referred to in particular as first electric motor. The second drive train has the remaining variable-length actuation part, which will hereinafter be referred to in particular as the second variable-length actuation part. Furthermore, the second drive train comprises the further electric motor, which will hereinafter be referred to in particular as second electric motor.

The first drive train furthermore has a sensor for detection of a position of a rotating part. Here, a "position" is to be understood in particular to mean an angular position and/or a rotational speed of the rotating part. Here, the sensor serves in particular for the direct detection of the position of the rotating part. The rotating part itself is preferably a constituent part of the first drive train and is in particular set in rotational motion during operation of the first electric motor. In summary, the first drive train has a single such sensor or several such sensors. By contrast, the second drive train has at most one sensor for detection of a position of a rotating part, wherein the rotating part is expediently a constituent part of the second drive train. In particular, the sensors of the two drive trains are of identical design to one another. The rotating part is suitably set in rotational motion during operation of the second electric motor. In particular, the rotating parts of the two drive trains are mechanically decoupled from one another, as a result of which the rotational movements of the two rotating parts are in particular not imperatively synchronized with one another. In particular, each rotating part is set in rotational motion owing to a current feed of the respective electric motor.

The two drive trains are preferably of identical design aside from the sensors. The rotating part of the first drive train suitably corresponds to the rotating part of the second drive train. In other words, they are the same functional part, wherein it is expediently the case that, during a rotation of the rotating part of the first drive train through a particular angle, the length of the variable-length actuation part of the first drive train is varied to the same extent as the length of the variable-length actuation part of the second drive is varied if the rotating part of the second drive train is rotated through the same angle.

In particular, the first drive train has exactly one such sensor. Here, the second drive train preferably likewise has the sensor, which preferably serves for the direct detection of the position of the rotating part. Thus, a coordination of the speeds of the two rotating parts is made possible by means of in each case one sensor, as a result of which the same force is imparted to the adjustable part by means of the two drive trains, and/or the locations at which the respective drive train is attached to the adjustable part are moved at substantially the same speed during operation.

Here, an exact determination of the direction of rotation of the respective rotating parts is duly not possible, as a result of which it is also not possible to determine whether the length of the actuation part is being increased or decreased. However, in the case of an adequately long time period between the switchover of the operating direction of the electric motor, a run-down of the electric motor is ensured, and consequently, the direction of rotation corresponds to the direction of the current feed of the electric motors.

The electric motors, and/or at least one end of each variable-length actuation part of the respective drive train, are suitably held positionally fixed in the installed state, for example on a body of the motor vehicle. In particular, the drive unit is designed such that the adjustable part is moved, for example pivoted, during a change in the length of the respective variable-length actuation parts. The variable-length actuation parts are preferably supported on the body in the installed state.

The position of the adjustable part is suitably determined by means of the sensors. Here, a functional relationship between the position of the rotating part and the position of the adjustable part is preferably taken into consideration. For example, a particular angular position of the rotating part corresponds to a particular position of the adjustable part, wherein the rotating part and the adjustable part are expediently coupled to one another by means of further components. For example, a particular number of rotations corresponds to a particular position of the adjustable part. The adjustment drive preferably has no further sensors by means of which the position of the rotating part or further constituent parts of the drive train can be determined. In particular, the adjustment drive has no further sensors by means of which the position of the adjustable part can be determined. In other words, the adjustment drive has no sensors aside from the sensors of the two drive trains. As a result, a relatively inexpensive adjustment drive is provided, wherein it is nevertheless possible by means of the two sensors for the position of the adjustable part to be determined, and wherein, owing to the two electric motors, an installation space is reduced.

For example, the respective variable-length actuation part comprises the respective sensor. It is however particularly preferable for the respective electric motor to comprise the sensor of the respective drive train. As a result, the electric motor can be manufactured as a unit, wherein the position of the rotor of the electric motor is detected by means of the sensor. It is thus possible for standard electric motors to be used, whereby production costs are further reduced. Also, in this way, it is possible to determine whether the electric motors of the two drive trains are being operated at a different speed owing to manufacturing tolerances.

The respective sensors for determination of the position of the rotating part are expediently Hall sensors. It is suitably the case that all sensors for determination of the position of the rotating part are Hall sensors. Consequently, the first drive train has at least one Hall sensor and the second drive train has at most one Hall sensor, wherein the adjustment drive expediently comprises no further Hall sensors or other sensors for determination of the position of a rotating part. By means of the Hall sensors, it is possible for the position of a rotating part to be determined relatively exactly, wherein the rotating part expediently has a permanent magnet of the Hall sensor. The active part of the Hall sensor is expediently held positionally fixed, which simplifies a construction. Here, the active part of the Hall sensor detects a sinusoidal or cosinusoidal signal, wherein each value of the sinusoidal or cosinusoidal signal corresponds to a particular angular position of the rotating part. In particular, the Hall sensor has a discretization circuit by means of which Hall pulses are generated, wherein each Hall pulse corresponds to a particular angular position, for example to a quarter-rotation of the rotating part, as a result of which four Hall pulses are generated during one full rotation of the rotating part. In this way, it is firstly possible to make statements regarding the position of the rotating part, wherein secondly, a volume of data is relatively low.

The first drive train preferably comprises two such sensors, which are in particular designed as Hall sensors. In particular, by means of the two sensors of the first drive train, the position of the in each case identical rotating part is determined. The two sensors are expediently offset with respect to one another by a particular fixed angle, in particular by 90°, about the axis of rotation of the rotating part. Consequently, both the rotational speed and the direction of rotation of the rotating part can be determined by means of the two sensors. This is performed, if the two sensors are Hall sensors, by comparison of the phase offset of the two sinusoidal or cosinusoidal signals, which differ from one another in a manner dependent on the direction of rotation. In particular, the first drive train comprises exactly two such sensors, wherein it is possible for substantially all of the data that define the position and the state of the rotating part to be detected. For example, it is the case here that the second drive train has the sensor.

In summary, by means of the total of three sensors, synchronous operation of the two rotating parts is made possible, wherein the direction is also known, at least that of the rotating part of the first drive train. If the two rotating parts are now always moved on the basis of the same demand, for example if the electric motors have the sensors, and the electric motors are consequently fed with current, synchronous operation of the two drive trains, in particular of the two electric motors, is made possible, wherein the direction of rotation of the electric motor of the first drive train is known. If the two electric motors are of the same design, and the current direction is the same, it is thus highly likely that the direction of rotation of the electric motor of the second drive train is also the same as the direction of rotation of the electric motor of the first drive train, wherein only three sensors are required for determining this information, which reduces production costs.

In a preferred embodiment of the invention, the second drive train is free from such sensors, which further reduces production costs. Furthermore, electronics and cabling required for the sensors can also be omitted, which further reduces production costs. In combination with this, the first drive train preferably has exactly two such sensors, as a result of which the adjustment drive comprises exactly two sensors. Here, by means of the sensors of the first drive train, both the speed and the position of the rotating part of the first drive train can be determined, for which purpose the sensors are suitably positioned such that a determination is possible. In summary, the rotating part of the first drive train is monitored with regard to rotational speed, whereas the rotating part of the second drive train is not monitored with regard to rotational speed.

During an adjustment of the adjustable part, it is thus possible for a position of the adjustable part to be determined by means of the sensors of the first drive train. In particular, it is the case that the adjustable part is moved between two stops, and/or the adjustment drive has, in particular, one stop. A stoppage of the movement of the adjustable part is expediently realized when said adjustable part has not yet fully reached the stop and is for example at a distance from the latter, wherein the distance expediently amounts to between 1 mm and 1 cm, 2 mm and 8 mm or 3 mm and 5 mm. The determination is preferably performed on the basis of the Hall pulses, wherein the electric motor is expediently deactivated a particular number of Hall pulses before the adjustable part reaches the stop. In particular, the adjustment drive is set up and provided so as to be operated in accordance with this method. Owing to manufacturing tolerances, it may be the case that the electric motor of the second drive train is operated at a slightly different speed than the electric motor of the first drive train, which is monitored with regard to rotational speed. Owing to the stoppage of the adjustable part at a distance from the stop ("soft stoppage"), it is ensured that, even in the case of a different rotational speed of the electric motor of the second drive train, the adjustable part does not at least partially bear, or is not at least partially pressed, against the stop, as a result of which bracing of the adjustable part is prevented. As a result, a service life of the mechanism of the adjustment drive is lengthened.

In a further alternative, the second drive train comprises no such sensor and is thus free from such sensors, and the first drive train has exactly one such sensor, such that the adjustment drive comprises exactly one such sensor, thus leading to relatively low production costs. If relatively long time periods are maintained between the change in the current feed of the two electric motors, an undesired follow-on movement is substantially taken into consideration, and the direction of rotation of the electric motor corresponds to the current feed or to the temporally preceding current feed. Here, the position of the rotating part, and consequently also that of the adjustable part itself, can be determined by means of the sensor of the first drive train. In particular, if a stop is provided, a stoppage of the adjustable part is realized at a certain distance before the stop, and said adjustable part is moved no further towards said stop, as a result of which a mechanical load on the adjustable part is reduced. Alternatively, each drive train comprises exactly one single such sensor.

For example, the variable-length actuation part is a thrust rod which is attached in particular eccentrically to a rotary element which is set in rotational motion when the respective electric motor is fed with current. It is however particularly preferable for the respective variable-length actuation part to be a spindle, wherein the two spindles preferably have the same pitches and are in particular of the same design as one another. Spindles can be manufactured relatively inexpensively, as a result of which production costs of the adjustment drive are further reduced. Owing to the two spindles, it is made possible for the adjustable part to be moved with a relatively high force, wherein the movement can be performed by means of electric motors with a relatively high rotational speed. Such electric motors can be manufactured relatively inexpensively and in an installation-space-saving manner, which further reduces production costs of the adjustment drive. Also, upon a deactivation of the electric motors, owing to the relatively high friction of the respective spindle, a stiffness of movement is provided, as a result of which the adjustable part remains in the desired position even when the electric motor is deactivated. As an alternative to this, for the purposes of holding the adjustable part, the respective electric motor is fed with a relatively low electrical current, such that, despite the action of a force exerted on the electric motor by the adjustable part, said electric motor remains stationary, as a result of which the adjustable part remains in the desired position.

The second drive train preferably comprises a current sensor for detection of a motor current of the electric motor. In other words, during operation, the motor current of the electric motor of the second drive train is detected. In particular, the current sensor of the second drive train has a shunt resistor, wherein the electrical voltage that prevails across the shunt is detected, and the motor current is inferred from this. In particular, the adjustment drive is set up such that, if the motor current exceeds a particular threshold value, the electric motor of the second drive train, and in particular also the electric motor of the first drive train, is deactivated. The motor current corresponds to the torque imparted by means of the electric motor. Consequently, if the adjustable part is moved against a relatively fixed stop, for example an end stop, and the adjustable part is mechanically braced, the motor current increases. With suitable selection of the threshold value, the electric motor is thus deactivated, in particular if said electric motor has no sensor, and it is consequently not possible to determine the rotational speed at which the electric motor is operated. Thus, when the adjustable part bears against the stop, no further force is exerted on the adjustable part by means of the electric motor.

It is particularly preferable if, in combination with this, the first drive train likewise has a current sensor, which is expediently of the same design as the current sensor of the second drive train. In this case, too, the adjustment drive is expediently set up such that, if the motor current increases beyond the threshold value, the electric motor or both electric motors are deactivated. In particular if both drive trains each have at most one sensor, it is thus duly the case that the rotational speed of the two rotating parts and in particular of the two electric motors can be determined, such that the length of the two variable-length actuation parts is varied preferably synchronously. However, owing to an absence of direction information, it may be the case that, upon a change in the current feed, owing to a relatively long follow-on movement of the electric motors, the direction of rotation has not been correctly determined, such that the absolute position of the adjustable part deviates from the assumed position by a particular magnitude. As a result, it may be the case that the position of the adjustable part is incorrectly determined, and said adjustable part is moved against a stop by means of the two electric motors. Owing to the current sensor or the current sensors, current monitoring is thus provided, as a result of which it is possible to reliably identify whether the adjustable part is moved against the stop. In this case, the electric motor is deactivated, which reduces mechanical bracing of the adjustable part or of further components of the adjustment drive.

The adjustable drive preferably comprises an anti-pinch protection facility for shutting off a current feed of both electric motors if a characteristic variable of one of the electric motors reaches a deactivation threshold. For example, a shut-off is performed if the characteristic variable is greater than or equal to the deactivation threshold. The current feed is either shut off for a particular period of time or is resumed again substantially without a delay after the shut-off, wherein the polarity is exactly reversed, such that the current flow direction is exactly opposite. As a result, the two electric motors are operated exactly oppositely to the original direction of rotation. In particular, the adjustment drive is operated such that the current feed of both electric motors is shut off if the characteristic variable of one of the electric motors is greater than the deactivation threshold. Here, the characteristic variable is for example the motor current, which in particular corresponds to the torque imparted by means of the respective electric motor. Alternatively, the characteristic variable is a rotational speed of the electric motor or an electrical voltage applied to the electric motor.

For example, the deactivation thresholds of the two electric motors differ from one another, wherein preferably the same characteristic variables are used for the electric motors. In particular, the deactivation threshold of the electric motor of the second drive train is lower than the deactivation threshold of the electric motor of the first drive train. Since the state of the electric motor of the second drive train is not fully known owing to at most the one sensor, it may be the case that the state of the second drive train differs from an assumed state owing to manufacturing tolerances, as a result of which, for example, the length of the variable-length actuation part of the second drive train is varied with a speed greater than the speed with which the length of the variable-length actuation part of the first drive train is varied. As a result, it is possible that a greater force is exerted on the adjustment part, and consequently also on any pinched object, by the second drive train. Owing to the relatively low deactivation threshold, therefore, damage to the pinched object is reduced. In summary, it is necessary, in the case of different adjustment speeds, for different amounts of kinetic energy to be dissipated in the event of pinching, which is realized through the different selection of the deactivation thresholds. In particular, the deactivation threshold is dependent on the position of the adjustable part, and is preferably not constant.

The adjustment drive preferably comprises a control unit which comprises a theoretical model of the electric motor of the second drive train, wherein, during operation, a follow-on movement of the electric motor of the second drive train in the event of a change in the current feed of the electric motor is determined on the basis of the theoretical model. Here, the follow-on movement refers in particular to a change in angle which, after a change in the current feed, for example after a shut-off of the current feed, continues to occur in the original direction of rotation owing to inertia. In particular, the adjustment drive is operated such that the follow-on movement of the electric motor of the second drive train in the event of a change in the current feed is determined by means of the theoretical model. Consequently, if the second drive train has only one sensor, it is possible on the basis of the theoretical model to determine the direction in which the rotating part is moved, wherein the position is determined on the basis of the sensor. In summary, it is possible by means of the theoretical model to determine the reversal of the direction of rotation of the rotating part. If the second drive train has no sensor, then an estimated value for the position of the rotating part, and consequently for the adjustable part, is provided at least by means of the theoretical model. The control unit particularly preferably furthermore comprises a theoretical model of the electric motor of the first drive train, which serves for the determination of a follow-on movement of the electric motor of the first drive train in the event of a change in the current feed of the electric motor of the first drive train. For example, the two theoretical models are identical if the two electric motors are of the same design. Consequently, if both drive trains each have only a single sensor, then it is possible to determine the rotational speed on the basis of the sensors, wherein the direction of rotation of the rotating parts is determined on the basis of the respective theoretical models. As a result, the position of the adjustable part is determined with relatively high certainty.

It is preferable if, during operation, the two electric motors have the same control variable applied to them. In particular, the two electric motors are connected electrically in parallel or in series with respect to one another. As a control variable, use is made in particular of an electrical current. The two electric motors suitably have the output of the same regulator applied to them, and/or are connected to the same output of a control unit or of the control unit. As a result, the movement of the electric motor of the second drive train substantially corresponds to the movement of the electric motor of the first drive train, such that the position of the adjustable part and the length of the variable-length actuation part of the respective drive train can be determined with relatively high certainty too. Also, only a single set of electronics is required, which further reduces production costs. In particular, the adjustment drive comprises only a single such set of electronics/regulator. In particular, the two electric motors are, owing to the fact that they have the same control variable applied to them, operated substantially with the same speed.

With the above and other objects in view there is also provided, in accordance with the invention, an adjustment drive for an adjustable part of a motor vehicle, the adjustment drive comprising:

a drive unit having a first drive train with a variable-length actuation part and a second drive train with a variable-length actuation part, each said variable-length actuation part being connected to the adjustable part of the motor vehicle;

an electric motor of said first drive train connected to drive said actuation part of said first drive train and said actuation part of said second drive train; and said first drive train having exactly one single sensor for detecting a position of a rotating part and said second drive train having no sensor for detection of a position of a rotating part.

In this alternative, the adjustment drive of a motor vehicle, in particular electromotively operated tailgate, comprises an adjustable part and a drive unit with a first drive train and with a second drive train. Each drive train comprises a variable-length actuation part attached to the adjustable part, which actuation parts are both driven by an electric motor of the first drive train. The first drive train has exactly one single sensor for detection of a position of a rotating part, and the second drive train is free from sensors for detection of a position of a rotating part. This alternative differs in particular from the preceding embodiment merely in that this embodiment has only a single electric motor. The refinements and advantages of the two adjustment drives of the motor vehicle are analogously transferable.

The drive unit of an adjustment drive of a motor vehicle has a first drive train and a second drive train, wherein each drive train comprises a variable-length actuation part which is driven by an electric motor of the respective drive train. The first drive train has at least one sensor for detection of a position of a rotating part, and the second drive train has at most one sensor for detection of a rotating part, wherein the rotating part is expediently in each case a constituent part of that drive train to which the respective sensor is assigned. The respective sensors are expediently Hall sensors. Alternatively, the drive unit comprises only a single electric motor, specifically the electric motor of the first drive train, by means of which the two variable-length actuation parts are driven. Here, the first drive train has exactly one single sensor for detection of a position of a rotating part, and the second drive train is free from sensors for detection of a position of a rotating part.

Other features which are considered as characteristic for the invention are set forth in the appended claims.

Although the invention is illustrated and described herein as embodied in an adjustment drive of a motor vehicle and drive unit for an adjustment drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts which correspond to one another are denoted by the same reference designations throughout the figures.

DETAILED DESCRIPTION OF THE INVENTION

Figure 1:
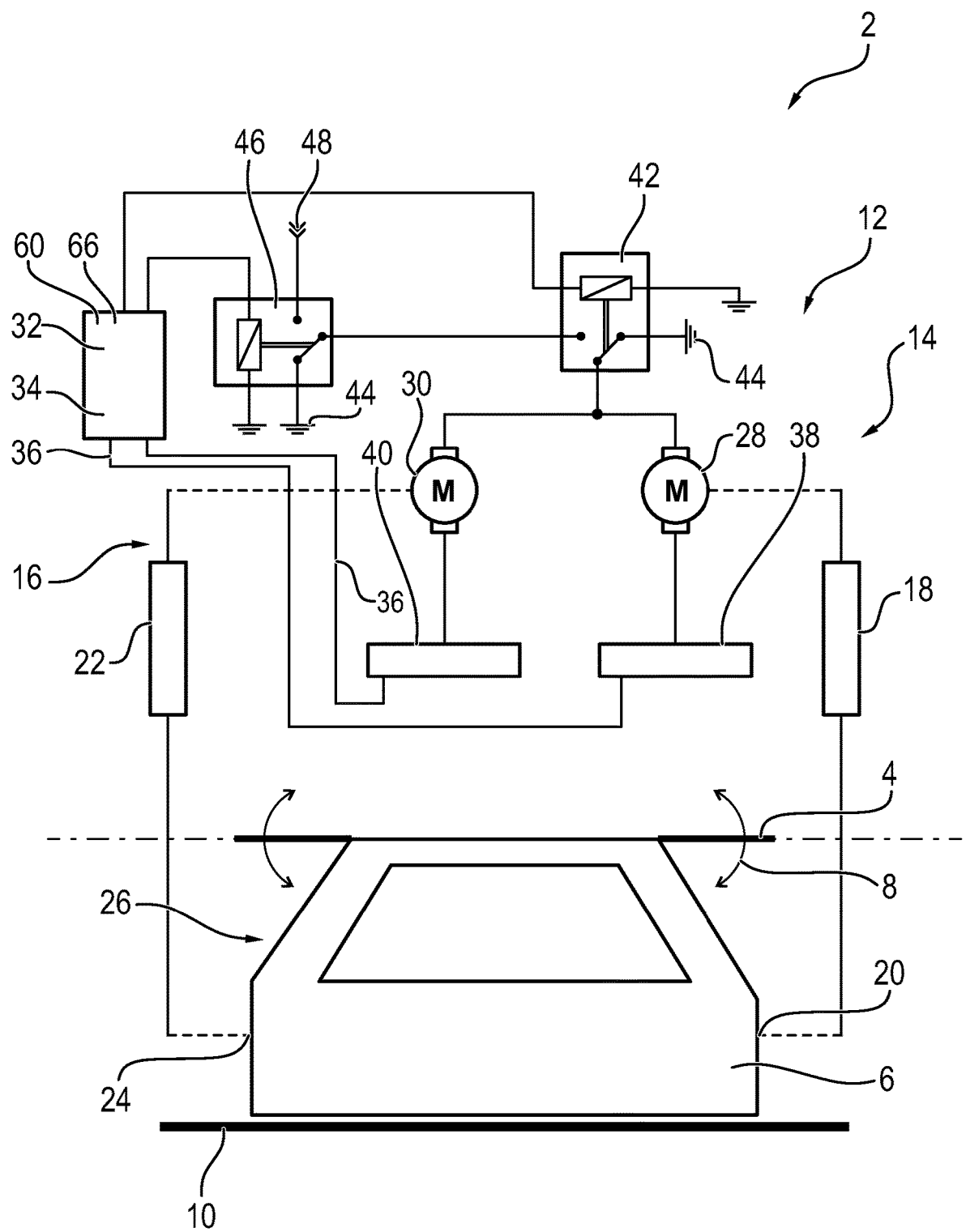
FIG. 1 schematically shows an electromotively operated tailgate with two electric motors.

Referring now to the figures of the drawing in detail and first, particularly, to FIG. 1 thereof, there is shown an electromotively operated tailgate 2 having a flap 6 which is mounted so as to be pivotable about a pivot axis 4 and by means of which a luggage compartment (not illustrated) of a motor vehicle is closed off. For this purpose, the flap 6 can be moved about the pivot axis 4 in a pivoting direction 8 and placed against a stop 10 which is formed by a body. Here, the flap 6 is placed against the stop 10 for example during the opening process. In other words, the stop 10 delimits the opening movement of the flap 6. For the automatic opening and closing of the flap 6, the electromotively operated tailgate 2 comprises a drive unit 12 with a first drive train 14 and a second drive train 16. A spindle 18 of the first drive train 14 is attached to the flap 6 at a first position 20, and a spindle 22 of the second drive train 16 is attached to the flap 6 at a second position 24, wherein the two positions 20, 24 lie in a horizontal plane and are spaced apart from one another. The two positions 20, 24 are situated substantially at opposite free ends of the flap 6.

Each of the two spindles 18, 22 is supported on a body (not illustrated in any more detail) and is a variable-length actuation part, such that a position 26 of the flap 6 with respect to the stop 10 can be adjusted by means of the two spindles 18, 22. The first drive train 14 has an electric motor 28, by means of which the spindle 18 of the first drive train 14 is driven, and the second drive train 16 comprises an electric motor 30, by means of which the spindle 22 of the second drive train 16 is driven. The two electric motors 28, 30 are operated by means of a control unit 32 which comprises a regulator 34 for adjustment of a motor current 36. The regulator 34 performs pulse width modulation of the motor current 36, wherein the two electric motors 28, 30 have the same motor current 36 applied to them as control variable. The respective motor current 36 is monitored by means of a current sensor 38 of the first drive train 14 and by means of a current sensor 40 of the second drive train 16. The two current sensors 38, 40 are of the same design and each comprise a shunt resistor.

The two electric motors 28, 30 are furthermore connected to a first relay 42, by means of which the two electric motors 28, 30 are connectable either to ground 44 or to a second relay 46, by means of which contact with an on-board electrical system potential 48 can be established, wherein the electrical voltage between the on-board electrical system potential 48 and ground 44 is 12 V. The two relays 42, 46 are controlled by means of the control unit 32, wherein the direction of rotation of the two electric motors 28, 30 is determined by means of the two relays 42, 46. The rotational speed is adjusted by means of the regulator 34, which produces a pulsed electrical motor current 36 through the respective electric motors 18, 20. The flap 6 is pivoted about the pivot axis along the pivoting direction 8, that is to say toward or away from the stop 10, in a manner dependent on the direction of rotation of the electric motor.

Figure 2:
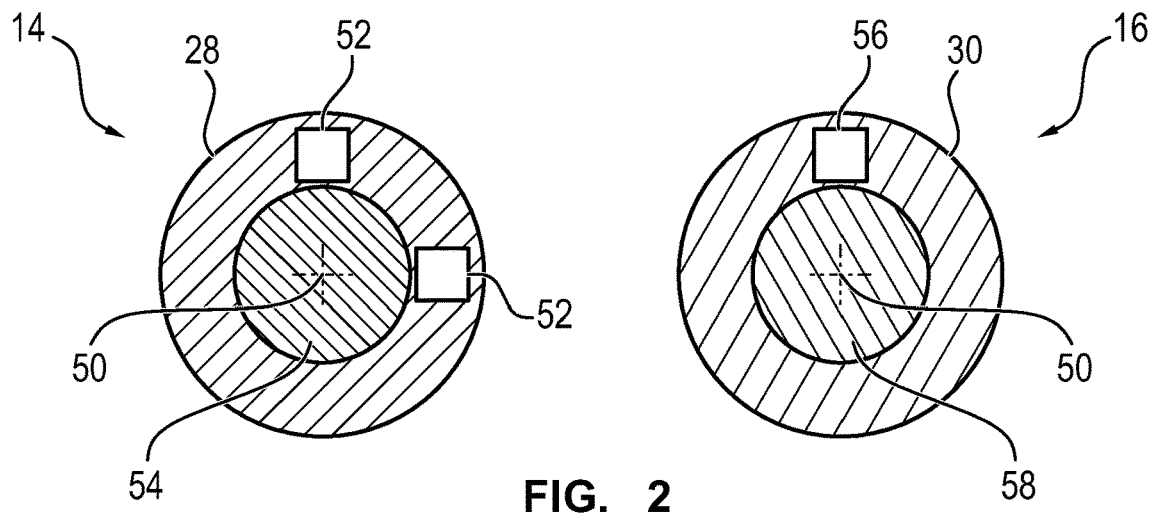
FIGS. 2-5 show different refinements of the electric motors in schematically simplified form.

The two drive trains 14 and 16 are of the same design aside from the two electric motors 28, 30. FIG. 2 illustrates, in schematically simplified form, a first embodiment of the two electric motors 28, 30 in a sectional illustration perpendicular to the respective axis of rotation 50 thereof, wherein the positions of the two electric motors 28, 30 have been interchanged. The electric motor 28 of the first drive train 14 has, in a first embodiment, two Hall sensors 52 which are offset by substantially 90° with respect to one another about the axis of rotation 50. A position of a rotor 54 of the electric motor 28 is detected by means of the two Hall sensors 52. The rotor thus constitutes a rotating part of the first drive train 14. The electric motor 30 of the second drive train 16 has only a single Hall sensor 56, by means of which the position of a rotor 58 of the electric motor 30 of the second drive train 16 can be detected, which rotor thus constitutes a rotating part of the second drive train 16.

During operation, both the direction of rotation and the rotational speed of the rotor 54 are detected by way of the two Hall sensors 52 of the electric motor 28 of the first drive train 14. By contrast, the Hall sensor 56 of the electric motor 30 of the second drive train 16 permits detection only of the rotational speed of the rotor 58. By means of the Hall sensors 52, 56, it is made possible to determine the position of the respective rotor 54, 58 and consequently to determine the length of the two spindles 18, 22, such that the position 26 of the flap 6 can be determined. Here, the two electric motors 28, 30 can be operated substantially synchronously on the basis of the rotational speed that can be determined by means of the Hall sensors 52, 56, wherein the Hall sensors 52 of the electric motor 28 of the first drive train 14 are used for determination of the direction of rotation of the electric motors 28, 30. Since both electric motors 28, 30 have the same motor current 36 applied to them, they are also operated in the same direction, as a result of which the flap 6 is pivoted in substantially uniform fashion. The two electric motors 28, 30 are of the same design aside from the different number of Hall sensors 52, 56.

Figure 3:
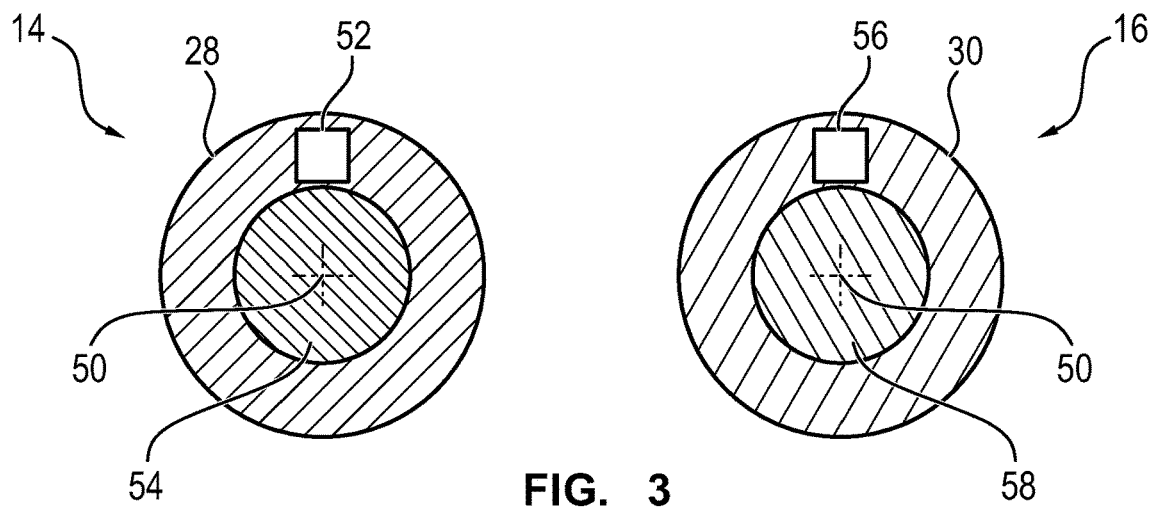

FIG. 3 illustrates a further embodiment of the two electric motors 28, 30, wherein each of the electric motors 28, 30 has in each case only a single Hall sensor 52, 56, such that, by means of said sensor, only the speed of the respective rotor 54, 58 can be determined. In this case, too, the two rotors 54, 58 can be moved substantially synchronously on the basis of the measurement signals of the two Hall sensors 52, 56. The control unit 32 has a theoretical model 60 of the two electric motors 28, 30, by means of which model a follow-on movement 62 of the respective electric motor 28, 30 in the event of a change in the current feed is determined.

Figure 7:
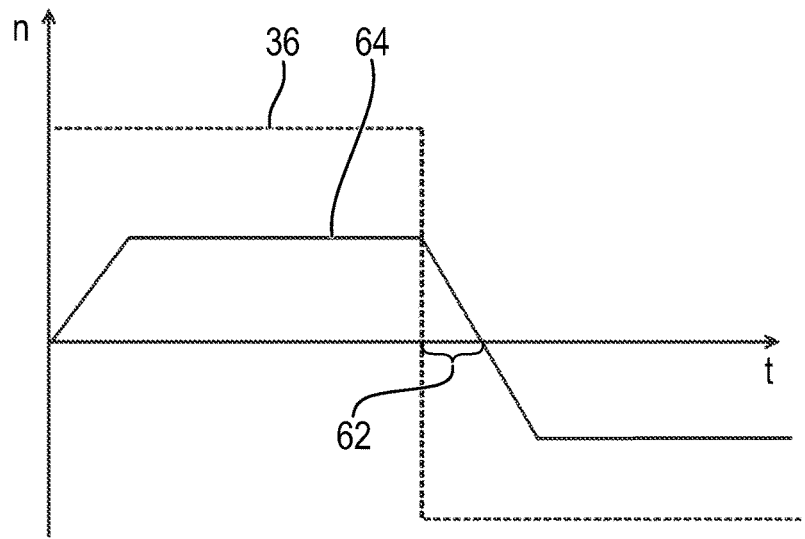
FIG. 7 shows a change in the current feed of one of the electric motors.

FIG. 7 illustrates the profile with respect to time of a rotational speed 64 of one of the two electric motors 28, 30 in simplified form. After the application of the motor current 36 to the electric motor 28, 30, the rotational speed 64 increases until it has reached a substantially constant level, which corresponds to the motor current 36. Here, the time period until the constant rotational speed 64 is reached is dependent on the inertia of the respective electric motor 28, 30 and on further components of the respective drive train 14, 16 and on the inertia of the flap 6. If a direction reversal is to be performed and the two relays 42, 46 are actuated correspondingly, the follow-on movement 62 occurs, in the case of which the electric motor 28, 30 continues to run in the original direction of rotation for a certain period of time, owing to the inertia, despite the direction reversal of the motor current 36. The follow-on movement 62 is determined by means of the theoretical model 60. Thus, by means of the rotational speeds determined on the basis of the Hall sensors 52, 56, and by means of the theoretically calculated follow-on movement 62 determined on the basis of the theoretical model 60, the point in time from which the reversal of the direction of rotation of the electric motor 28, 30 occurs is determined, as a result of which the position 26 of the flap 6 can be determined.

Figure 4:
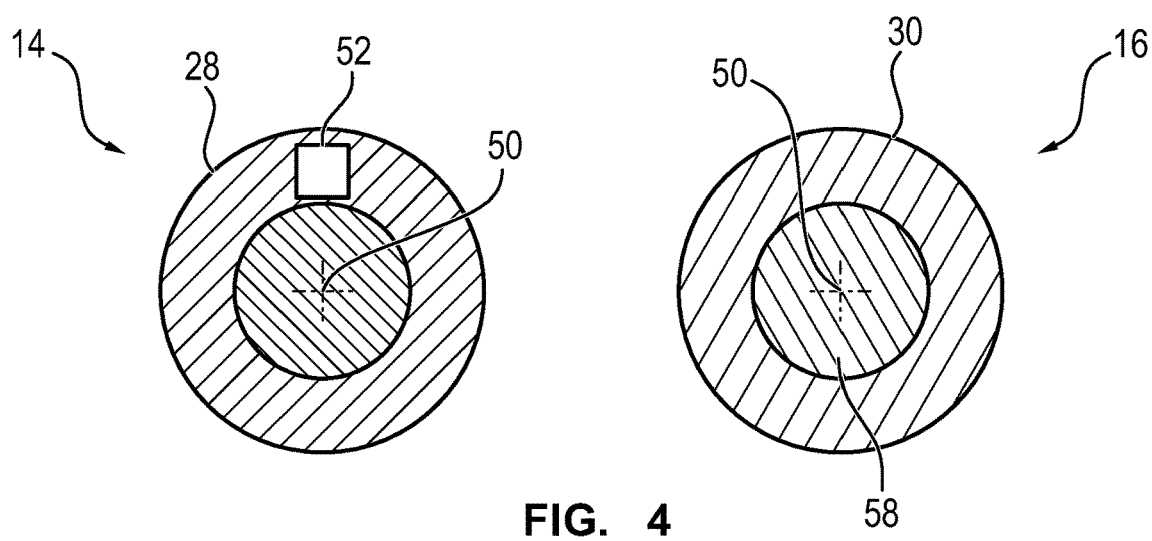

FIG. 4 illustrates a further embodiment of the two electric motors 28, 30. The second drive train 16 is free from the Hall sensor 56 and from other sensors that could be used for determining the present state of the second drive train 18. Only the current sensor 40 is provided. As in the preceding exemplary embodiment, the electric motor 28 of the first drive train 14 has only the single Hall sensor 52, such that the rotational speed of the electric motor 28 can be determined. Here, the follow-on movement 62 in the event of a change in the current feed, and any start-up time, are determined by means of the theoretical model 60, such that, in conjunction with the measurement data from the Hall sensor 52, both the direction of rotation and the rotational speed 64 of the electric motor 28 of the first drive train 14 are determined.

Since the two electric motors 28, 30 have the same motor current 36 applied to them, it is the case here that the rotational speed 64 of the electric motor 30 of the second drive train 16 substantially corresponds to the rotational speed 64 of the electric motor 28 of the first drive train 16. In order that any manufacturing tolerances can be compensated, however, the tailgate 6 is not moved fully against the stop 10, with a certain distance being left to the latter if the flap 6 is to be closed. As a result, even in the event of a slight difference in rotational speed 64 of the two electric motors 28, 30, no mechanical bracing arises in the closed state, thus lengthening the service life of the electromotively operated tailgate 2. In particular, for this purpose, the motor current 36 is monitored by means of the two current sensors 38, 40. If the motor current 36 exceeds a particular predefined value, this is evaluated as an abutment of the flap 6 against the stop 10, and the current feed of the two electric motors 28, 30 is shut off.

Figure 5:
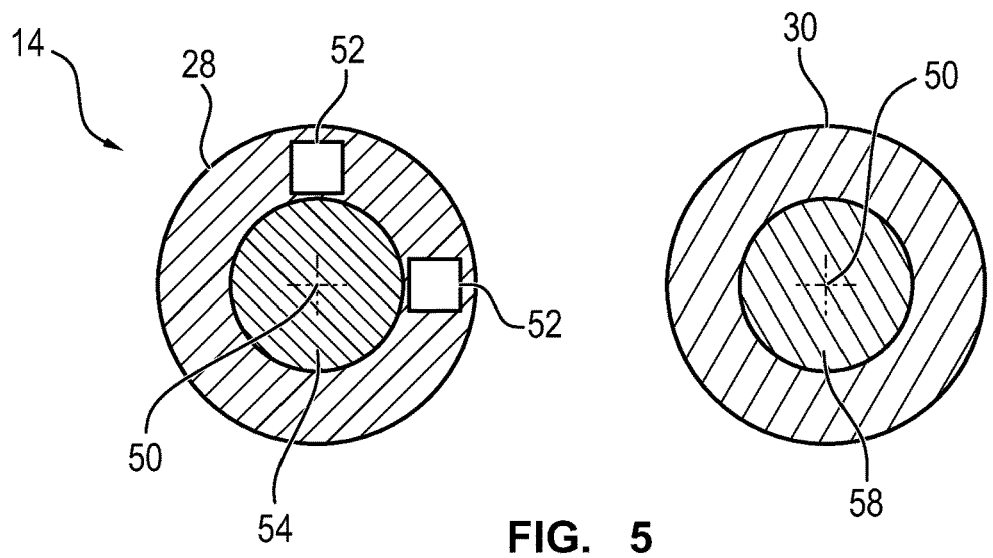

FIG. 5 illustrates a final embodiment of the two electric motors 28, 30, wherein it is the case here in turn that the second drive train 16 is free from the Hall sensors 56. As in the example illustrated in FIG. 2, the electric motor 28 of the first drive train 14 again has the two Hall sensors 52, which are offset with respect to one another through 90° about the axis of rotation 50. By contrast to the preceding example, it is thus possible for the direction of rotation of the electric motor 28 of the first drive train 14 to be determined by means of the two Hall sensors 52. The position of the rotor 58 of the electric motor 30 of the second drive train 16 is determined by means of the theoretical model 60 and on the basis of the motor current 36 and using the measurement data from the Hall sensors 52 of the first drive train 16. In this case, too, the flap 6 is not moved against the stop 10, it rather being the case that the current feed of the two electric motors 28, 30 is shut off when the flap 6 is at a particular distance from the stop 10, such that in this case, too, any manufacturing tolerances are compensated. In this case, too, the motor current 36 is monitored, and the current feed of the two electric motors 28, 30 is shut off in the event of an overshoot of the threshold value.

Figure 6:
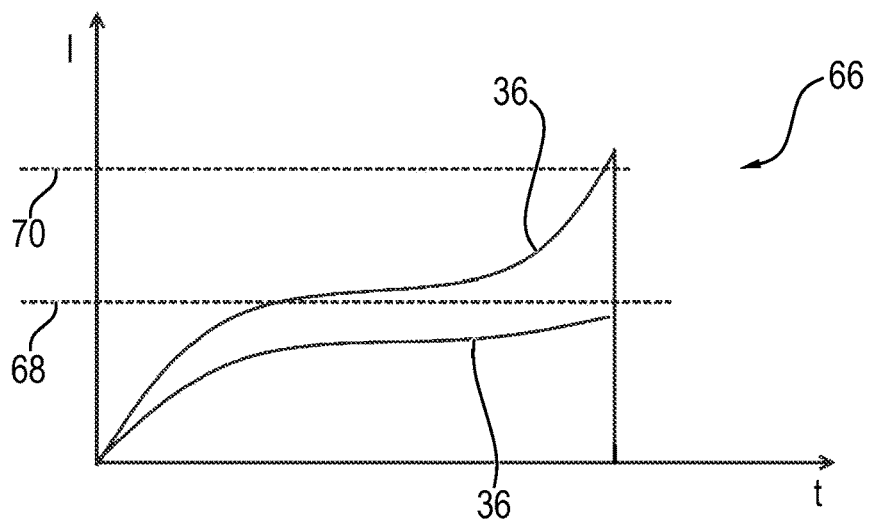
FIG. 6 shows a profile with respect to time of an electrical current of the two electric motors and a triggering of an anti-pinch protection facility.

The control unit 32 furthermore has an anti-pinch protection facility 66, which is illustrated by way of example in FIG. 6. A characteristic variable of the two electric motors 28, 30 is monitored, wherein the motor current 36 is used in each case as characteristic variable. Here, the motor 28 of the first drive train 14 is assigned a first deactivation threshold 68, and the electric motor 30 of the second drive train 16 is assigned a second deactivation threshold 70. The two deactivation thresholds 68, 70 differ, wherein the second deactivation threshold 70 is higher than the first deactivation threshold 68. This is the case in particular if the number of Hall sensors 52 of the first drive train 14 is greater than the number of Hall sensors 56 of the second drive train 16. In the example illustrated, the motor current 36 of the electric motor 30 of the second drive train 18 exceeds the second deactivation threshold 70, whereas the motor current 36 of the electric motor 28 of the first drive train 14 remains below the first deactivation threshold 68. Since it is however the case that one of the motor currents 36 increases beyond the respectively associated deactivation threshold 68, 70, the current feed of both electric motors is shut off by means of the anti-pinch protection facility 66.

In summary, it is taken into consideration that one of the two electric motors 28, 30 may rotate faster than the other, such that, in the event of pinching of an object, the possible pinching forces are of different magnitudes. It is consequently necessary for different amounts of kinetic energy to be dissipated. This is ensured through selection of the two different deactivation thresholds 68, 70. Since the pinching force is proportional to the motor current 36, it is consequently also the case that the force imparted by means of the respective electric motor 28, 30 is monitored by means of the two current sensors 38, 40.

Figure 8:
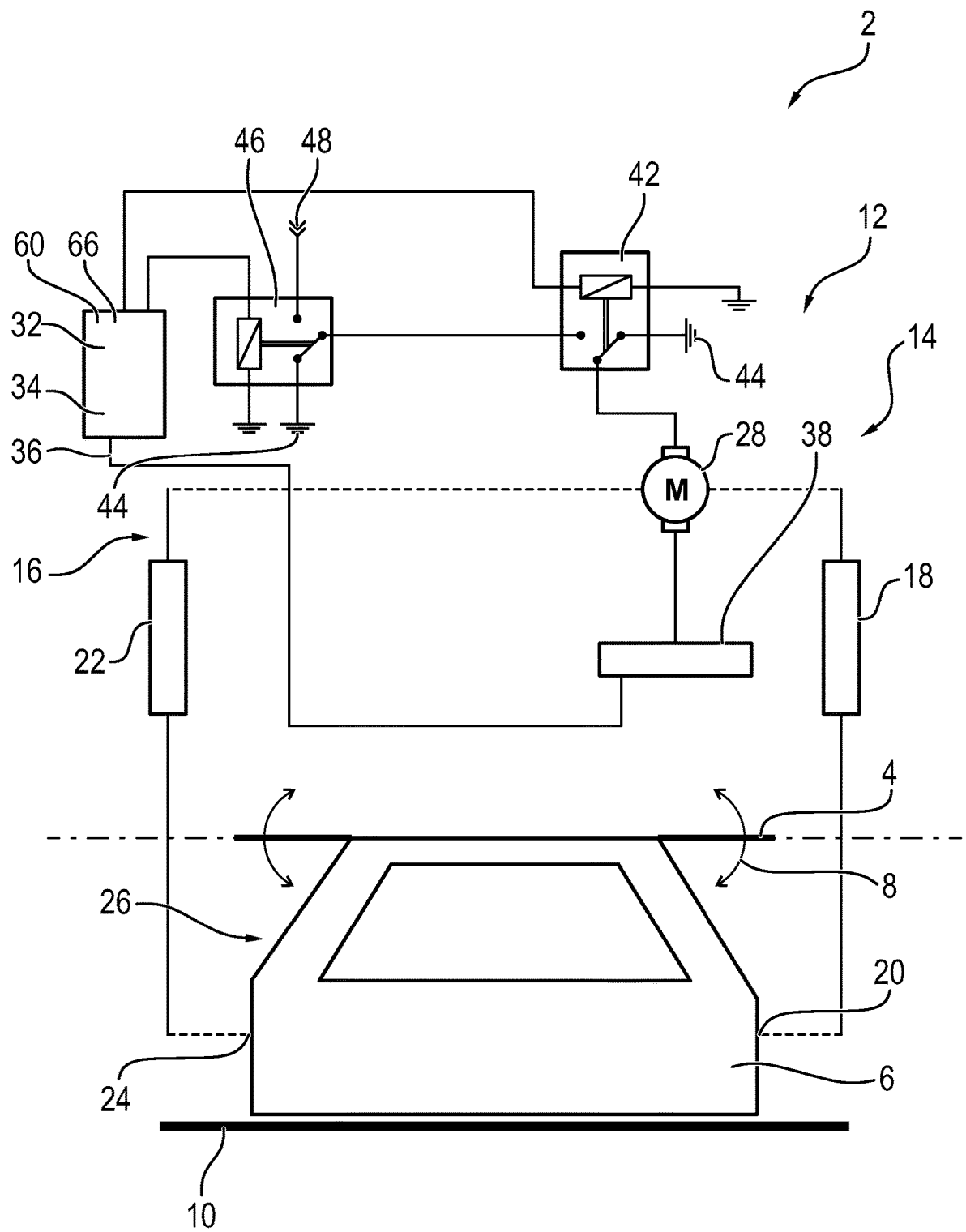
FIG. 8 schematically shows an alternative of the electromotively operated tailgate.

FIG. 8 shows a further alternative of the electromotively operated tailgate 2 as per FIG. 1. In relation to the variant shown in FIG. 1, the drive unit 12 has been modified, but the rest has been left unchanged. The drive unit 12 has only a single electric motor, specifically the electric motor 28 of the first drive train 14, which drives both the spindle 18 of the first drive train 14 and the spindle 22 of the second drive train 16. In other words, the electric motor 30 of the second drive train 16 and the current sensor 40 of the second drive train 16 have been omitted. The electric motor 28 of the first drive train 14 as shown in FIG. 4 is used as the electric motor 28 of the first drive train 14. Consequently, the first drive train 14 has exactly the single sensor 52, which is a Hall sensor and by means of which the position of the rotor of the electric motor 28 of the first drive train 14, as the rotating part 54 of the first drive train 14, can be detected. The second drive train 16 has no such sensor 56 for detection of the position of a rotating part 58, and is thus free from such sensors. In summary, the second drive train 16 is free from Hall sensors.

The invention is not restricted to the exemplary embodiments described above. Rather, it is also possible for other variants of the invention to be derived therefrom by a person skilled in the art without departing from the subject matter of the invention. In particular, it is also the case that all individual features described in conjunction with the individual exemplary embodiments may also be combined with one another in some other way without departing from the subject matter of the invention.

The following is a summary list of reference numerals and the corresponding structure used in the above description of the invention:

2 Electromotively operated tailgate
4 Pivot axis
6 Flap
8 Pivoting direction
10 Stop
12 Drive unit
14 First drive train
16 Second drive train
18 Spindle of the first drive train
20 First position
22 Spindle of the second drive train
24 Second position
26 Position of the flap
28 Electric motor of the first drive train
30 Electric motor of the second drive train
32 Control unit
34 Regulator
36 Motor current
38 Current sensor of the first drive train
40 Current sensor of the second drive train
42 First relay
44 Ground
46 Second relay
48 On-board electrical system potential
50 Axis of rotation
52 Hall sensor
54 Rotating part of the first drive train
56 Hall sensor
58 Rotating part of the second drive train
60 Theoretical model
62 Follow-on movement
64 Rotational speed
66 Anti-pinch protection facility
68 First deactivation threshold
70 Second deactivation threshold

The invention claimed is:

1. An adjustment drive for driving an adjustable part of a motor vehicle, the adjustment drive comprising:
   a drive unit having a first drive train with a variable-length actuation part and a second drive train with a variable-length actuation part, each said variable-length actuation part being connected to the adjustable part of the motor vehicle;
   a first electric motor connected to and driving said actuation part of said first drive train and a second electric motor connected to and driving said actuation part of said second drive train; and
   said first drive train having at least one sensor for detecting a position of a rotating part of said first drive train, and said second drive train does not have any sensors for detecting a position of a rotating part of said second drive train.

2. The adjustment drive according to claim 1, wherein the adjustable part is an electromotively operated tailgate.

3. The adjustment drive according to claim 1, wherein said sensor is a part of said electric motor.

4. The adjustment drive according to claim 1, wherein the sensor is a Hall sensor.

5. The adjustment drive according to claim 1, wherein said first drive train has two said sensors.

6. The adjustment drive according to claim 1, wherein said at least one sensor of said first drive train is exactly one single sensor.

7. The adjustment drive according to claim 1, wherein said variable-length actuation part of each of said first and second drive trains is a spindle.

8. The adjustment drive according to claim 1, wherein said second drive train comprises a current sensor for detecting a motor current of said second electric motor.

9. The adjustment drive according to claim 1, which comprises an anti-pinch protection facility for shutting off a current feed of said first and second electric motors if a characteristic variable of one of said electric motors reaches a deactivation threshold, and wherein the deactivation thresholds of said first and second electric motors differ from one another.

10. The adjustment drive according to claim 1, which comprises a control unit containing a theoretical model of said second electric motor of said second drive train for determination of a follow-on movement of said second electric motor of said second drive train on occasion of a change in current feed.

11. The adjustment drive according to claim 1, wherein, during operation, said first and second electric motors have a common control variable applied thereto.

12. An adjustment drive for an adjustable part of a motor vehicle, the adjustment drive comprising:
- a drive unit having a first drive train with a variable-length actuation part and a second drive train with a variable-length actuation part, each said variable-length actuation part being connected to the adjustable part of the motor vehicle;
- an electric motor of said first drive train connected to drive said actuation part of said first drive train and said actuation part of said second drive train; and
- said first drive train having exactly one single sensor for detecting a position of a rotating part and said second drive train having no sensor for detection of a position of a rotating part.

13. The adjustment drive according to claim 12, wherein the adjustable part is an electromotively operated tailgate.

* * * * *